United States Patent
Watanabe

(10) Patent No.: US 10,557,549 B2
(45) Date of Patent: Feb. 11, 2020

(54) SHIFT DEVICE

(71) Applicant: KABUSHIKI KAISHA TOKAI-RIKA-DENKI-SEISAKUSHO, Aichi-ken (JP)

(72) Inventor: Tomoki Watanabe, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 433 days.

(21) Appl. No.: 15/370,676

(22) Filed: Dec. 6, 2016

(65) Prior Publication Data
US 2017/0175884 A1 Jun. 22, 2017

(30) Foreign Application Priority Data

Dec. 21, 2015 (JP) .................................. 2015-248900

(51) Int. Cl.
F16H 61/24 (2006.01)
F16H 63/34 (2006.01)
F16H 59/08 (2006.01)

(52) U.S. Cl.
CPC ............. F16H 61/24 (2013.01); F16H 59/08 (2013.01); F16H 63/3425 (2013.01); F16H 2059/081 (2013.01); F16H 2061/243 (2013.01)

(58) Field of Classification Search
CPC ............... F16H 2059/081; F16H 61/22; F16H 2061/223; F16H 63/3425; F16H 63/3416
See application file for complete search history.

(56) References Cited

U.S. PATENT DOCUMENTS

| 6,564,661 | B2 * | 5/2003 | DeJonge | B60K 37/06 74/335 |
| 7,571,662 | B2 * | 8/2009 | Pickering | B60K 37/06 200/61.88 |
| 7,971,498 | B2 * | 7/2011 | Meyer | B60K 37/06 200/19.18 |
| 9,122,300 | B2 * | 9/2015 | Oosawa | G05G 1/10 |
| 9,212,740 | B2 * | 12/2015 | Watanabe | F16H 59/08 |
| 9,334,949 | B2 * | 5/2016 | Fett | F16H 59/08 |
| 2010/0307276 | A1 * | 12/2010 | Giefer | F16H 59/10 74/473.3 |

(Continued)

FOREIGN PATENT DOCUMENTS

WO 2015/107592 A1 7/2015

Primary Examiner — William Kelleher
Assistant Examiner — Gregory T Prather
(74) Attorney, Agent, or Firm — Roberts Mlotkowski Safran Cole & Calderon P.C.

(57) ABSTRACT

A shift device includes a knob that is rotated to change a shift position, and an operation mechanism including a motor. At least one of restricting or releasing restriction of rotation of the knob is performed when the motor is driven, further, the shift position of the knob is changed to a specific shift position when the motor is driven. Thus, driving a common motor in the shift device enables at least one of restricting or releasing restriction of rotation of the knob to be performed, and enables the shift position of the knob to be changed to the specific shift position. This enables the configuration of the shift device to be simplified, and enables an increase in the size and an increase in the number of components in the shift device to be suppressed.

4 Claims, 9 Drawing Sheets

(56) References Cited

U.S. PATENT DOCUMENTS

| | | | |
|---|---|---|---|
| 2014/0007726 A1* | 1/2014 | Muraki | F16H 59/08 74/473.3 |
| 2015/0027861 A1* | 1/2015 | Hoskins | F16H 59/08 200/43.11 |
| 2015/0369358 A1* | 12/2015 | Lee | F16H 59/08 74/507 |
| 2016/0138704 A1 | 5/2016 | Watanabe et al. | |
| 2016/0238128 A1* | 8/2016 | Rake | F16H 59/08 |
| 2016/0245403 A1* | 8/2016 | Rake | F16H 61/22 |
| 2017/0074391 A1* | 3/2017 | Tebbe | F16H 59/08 |

\* cited by examiner

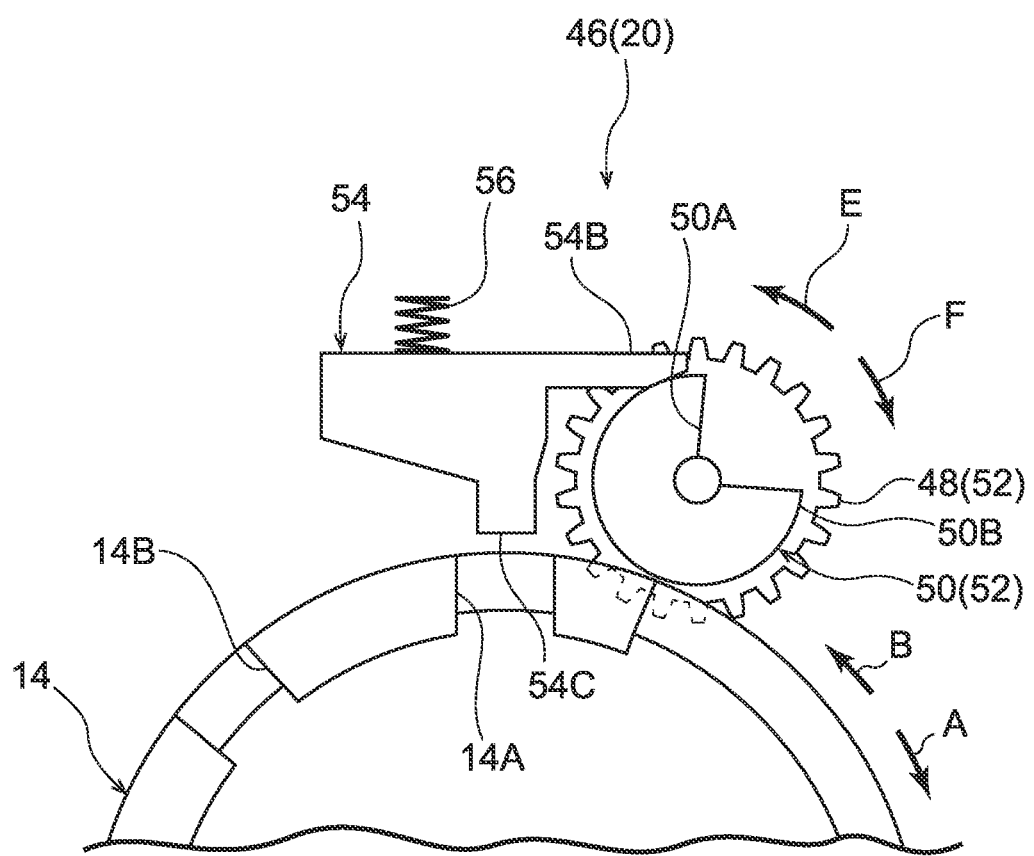

SHIFT DEVICE

CROSS-REFERENCE TO RELATED APPLICATION

This application claims priority under 35 USC 119 from Japanese Patent Application No. 2015-248900 filed Dec. 21, 2015, the disclosure of which is incorporated by reference herein.

BACKGROUND

Field of the Invention

The present invention relatives to a shift device.

Related Art

International Publication (WO) No. 2015/107592 describes a shift device (shift operation device) in which a gear position of a vehicle is switched by rotating a knob.

However, it is desirable to be able to suppress an increase in size and an increase in the number of components in such shift devices, from the perspectives of ease of installation in a vehicle and cost.

SUMMARY

In consideration of the above circumstances, the present disclosure obtains a shift device capable of suppressing an increase in size and an increase in the number of components.

A shift device of a first aspect includes: a shift body that is rotated to change a shift position; and an operation section that is provided with a drive section, the drive section being driven to perform at least one of restricting or releasing restriction of rotation of the shift body, and the drive section being driven to change a shift position of the shift body to a specific shift position.

A shift device of a second aspect is the shift device of the first aspect, wherein the operation section includes: a rotary unit that includes: the drive section, which is disposed at one side in a rotation axis direction of the shift body with respect to the shift body; and a transmission mechanism that transmits drive force of the drive section to the shift body; and a restricting section that is displaced by drive force of the drive section being transmitted so as to perform at least one of restricting or releasing restriction of rotation of the shift body.

A shift device of a third aspect is the shift device of the first aspect or the second aspect, wherein the operation section includes: a shift body-side gear that is configured to rotate integrally with the shift body; a shift body drive gear that meshes with the shift body-side gear and that is rotated by drive force of the drive section being transmitted; a cam gear that meshes with the shift body-side gear; a cam section that is configured to rotate integrally with the cam gear; and a restricting body that is engaged with the cam section, and that is displaced by the cam section being rotated so as to perform at least one of restricting or releasing restriction of rotation of the shift body.

A shift device of a fourth aspect is the shift device of the first aspect or the second aspect, wherein the operation device is configured including: a shift body-side gear that is configured to rotate integrally with the shift body; a drive section-side gear that is rotated by drive force of the drive section being transmitted; an intermediate gear that includes: a first intermediate gear that meshes with the shift body-side gear; and a second intermediate gear that meshes with the drive section-side gear, and that is configured to rotate integrally with the first intermediate gear, a part of the second intermediate gear and a part of the shift body-side gear being disposed so as to overlap with each other in a rotation axis direction of the shift body; an engaging portion that is displaced due to the shift body-side gear being rotated; and a restricting body that is engaged with the engaging portion, and that is displaced by rotation force of the shift body-side gear being transmitted so as to perform at least one of restricting or releasing restriction of rotation of the shift body.

In the shift device of the first aspect, the shift body is rotated to change a shift position of the shift body.

Note that in the shift device of the first aspect, when the drive section is driven, the operation section including the drive section performs at least one out of restricting or releasing restriction of rotation of the shift body, and changes the shift position of the shift body to the specific shift position. Thus, driving a common (the same) drive section enables at least one of restricting or releasing restriction of rotation of the shift body to be performed, and enables the shift position of the shift body to be changed to the specific shift position. This enables the configuration of the shift device to be simplified, and enables an increase in the size and an increase in the number of components in the shift device to be suppressed.

In the shift device of the second aspect, drive force of the drive section is transmitted to the shift body through the transmission mechanism, such that the shift body is rotated. Part of the drive force of the drive section that rotates the shift body is transmitted to the restricting section, such that at least one of restricting or releasing restriction of rotation of the shift body is performed. Note that in the shift device of the second aspect, the drive section is disposed on the one side in the rotation axis direction of the shift body with respect to the shift body. This enables an increase in the size of the shift device in a rotation radial direction of the shift body to be suppressed.

In the shift device of the third aspect, the shift body drive gear rotates when drive force of the drive section is transmitted to the shift body drive gear. The shift body-side gear that meshes with the shift body drive gear rotates when the shift body drive gear rotates. The shift body thereby rotates together with the shift body-side gear. When the shift body-side gear rotates, the cam gear that meshes with the shift body-side gear rotates, and the cam section rotates integrally with the cam gear. Thus, the restricting body that engages with the cam section is displaced so as to perform at least one of restricting or releasing restriction of rotation of the shift body. Note that the shift device of the third aspect is configured such that the shift body drive gear and the cam gear mesh with the same gear, namely, the shift body drive gear and the cam gear mesh with the shift body-side gear. This configuration enables an increase in the number of components configuring the transmission mechanism and the restricting section to be suppressed.

In the shift device of the fourth aspect, the drive section-side gear rotates when the drive force of the drive section is transmitted to the drive section-side gear. The intermediate gear, including the second intermediate gear that meshes with the drive section-side gear, rotates when the drive section-side gear rotates. The shift body-side gear that meshes with the first intermediate gear of the intermediate gear rotates when the intermediate gear rotates. The shift body thereby rotates together with the shift body-side gear.

When the shift body-side gear rotates, the engaging portion is displaced and the engaging portion is engaged with the restricting body. Rotation force of the shift body is thereby transmitted to the restricting body, and the restricting body is displaced. At least one of restricting or releasing restriction of rotation of the shift body is accordingly performed. Note that in the shift device of the fourth aspect, part of the second intermediate gear of the intermediate gear and part of the shift body-side gear are disposed overlapping each other in the rotation axis direction of the shift body. This configuration enables an increase in size in the radial direction of the shift body (the rotation radial direction of the shift body) to be suppressed.

BRIEF DESCRIPTION OF THE DRAWINGS

Exemplary embodiments will be described in detail with reference to the following figures, wherein:

FIG. 9 is a plan view schematically illustrating a shift lock mechanism and so on in a state in which rotation of a knob is not restricted.

DETAILED DESCRIPTION

Figure 1:
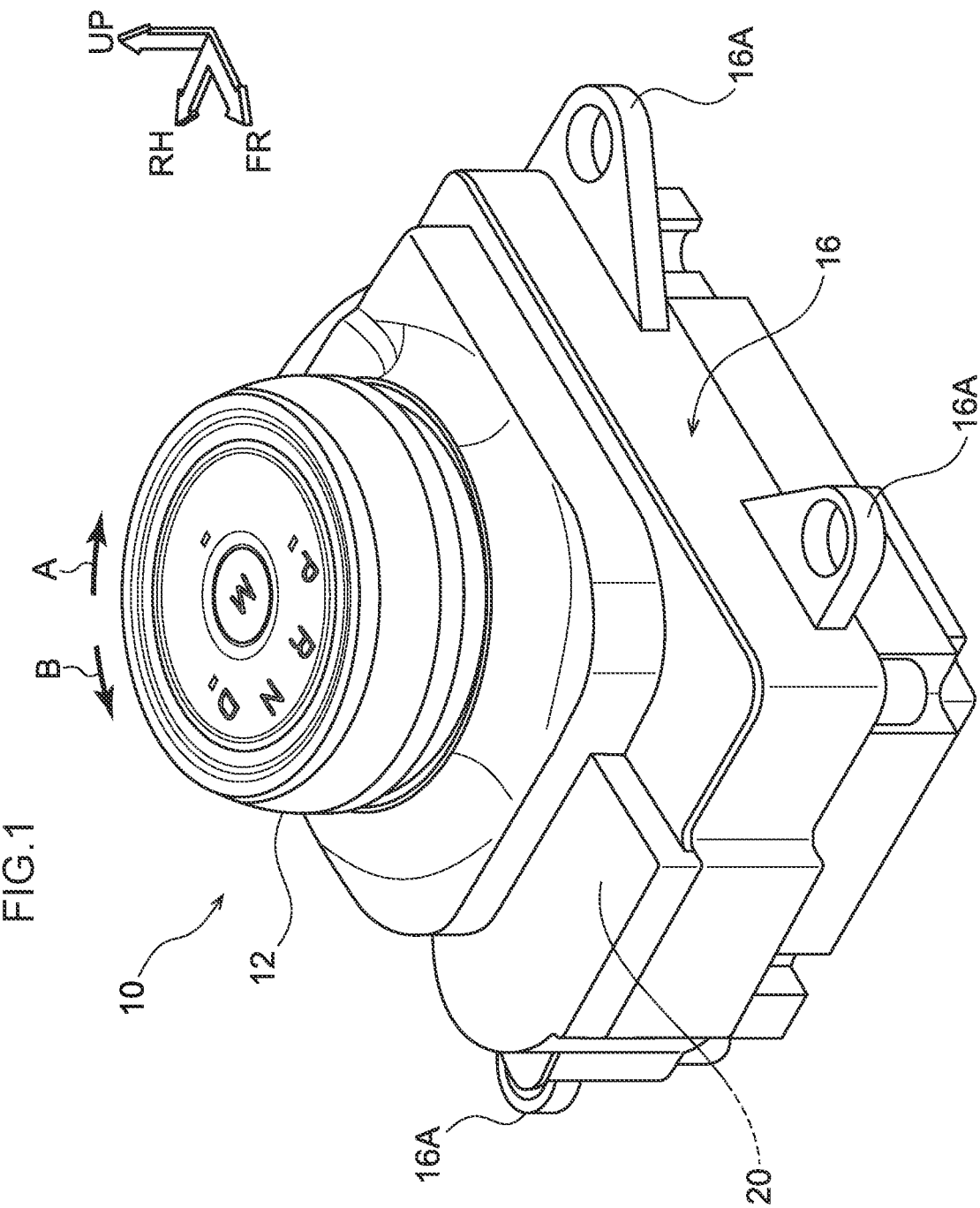
FIG. 1 is a perspective view illustrating a shift device of a first exemplary embodiment.

FIG. 1 illustrates a shift device 10 provided to an instrument panel of a vehicle. Note that in the drawings, the arrow FR indicates the front of the shift device 10, the arrow RH indicates the right of the shift device 10, and the arrow UP indicates the upper side of the shift device 10.

The shift device 10 according to a first exemplary embodiment is employed in what is referred to as a shift-by-wire type device that is electrically connected to the shift device 10 and is capable of changing a shift range of the vehicle. The shift device 10 is installed at the instrument panel of the vehicle (automobile), and is disposed at the vehicle front side and vehicle width direction inside of a driving seat (not illustrated in the drawings) of the vehicle. The front, right, and upper side of the shift device 10 respectively face the oblique upper front, right, and oblique upper rear of the vehicle.

Figure 2:
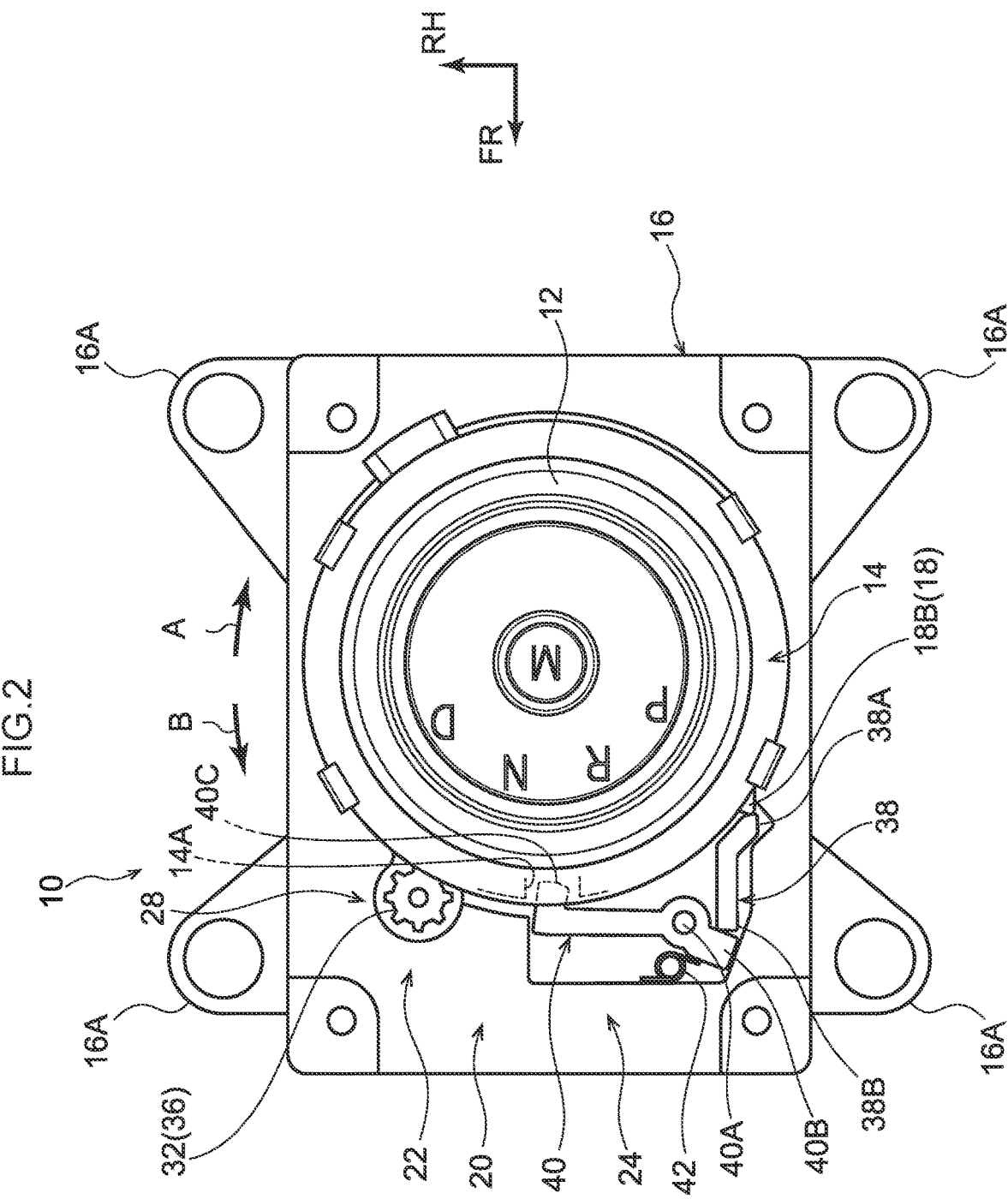
FIG. 2 is a plan view illustrating a shift device in a state in which a cover has been removed.

As illustrated in FIG. 1 and FIG. 2, the shift device 10 includes a knob base 16 that is formed in a box shape and supports a knob body 14 (see FIG. 3) and so on to which a knob 12, described later, is attached. Plural through-portions 16A for inserting bolts, not illustrated in the drawings, are provided in the knob base 16. The bolts that have been inserted through the through-portions 16A are screwed to a shift device fixing section disposed in the instrument panel so as to fix the shift device 10 to the shift device fixing section. Note that, in a state in which the shift device 10 has been fixed to the shift device fixing section, the knob 12 projects out into a vehicle cabin through an opening formed in the instrument panel.

Figure 3:
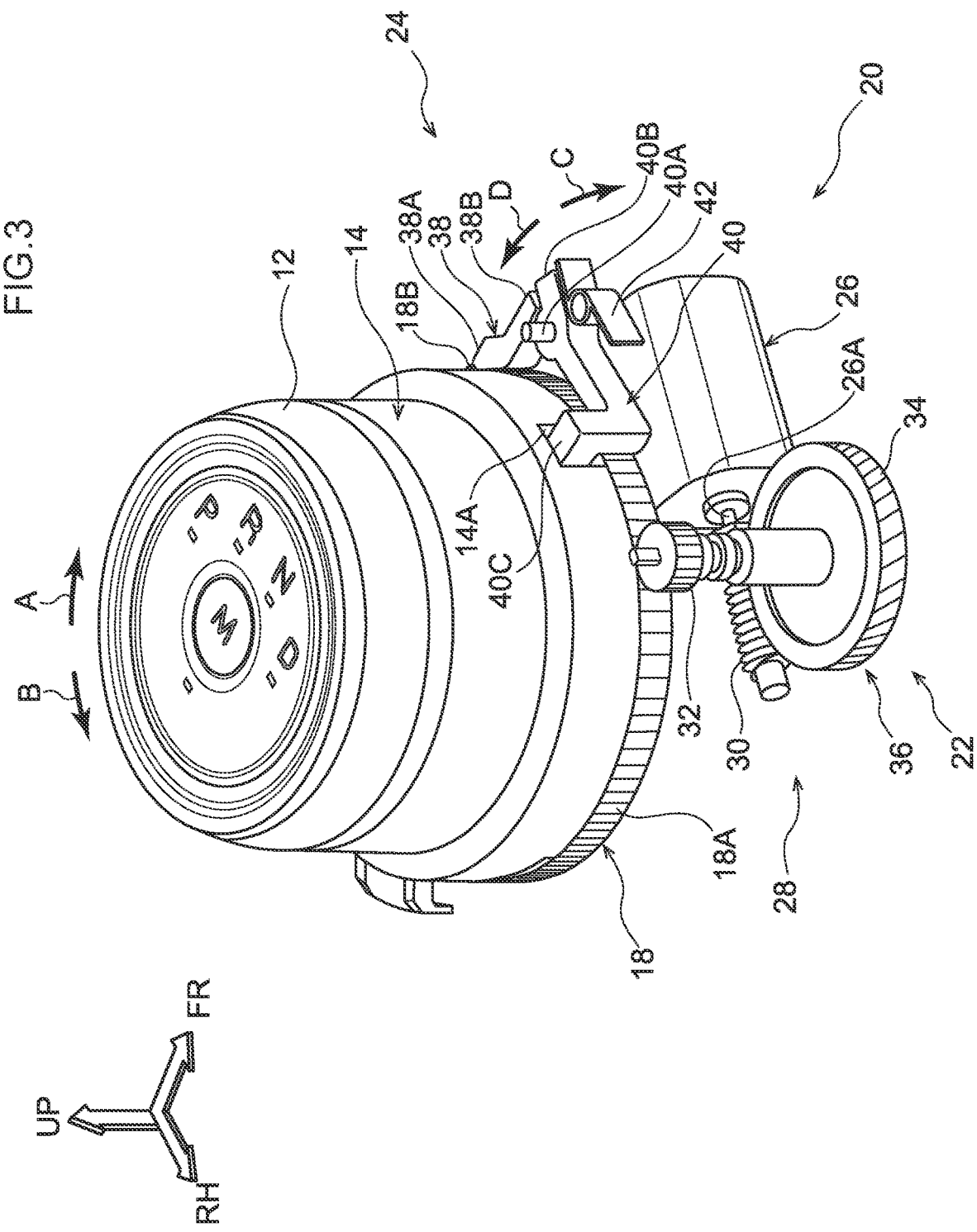
FIG. 3 is a perspective view illustrating a knob and an operation mechanism.
Figure 4:
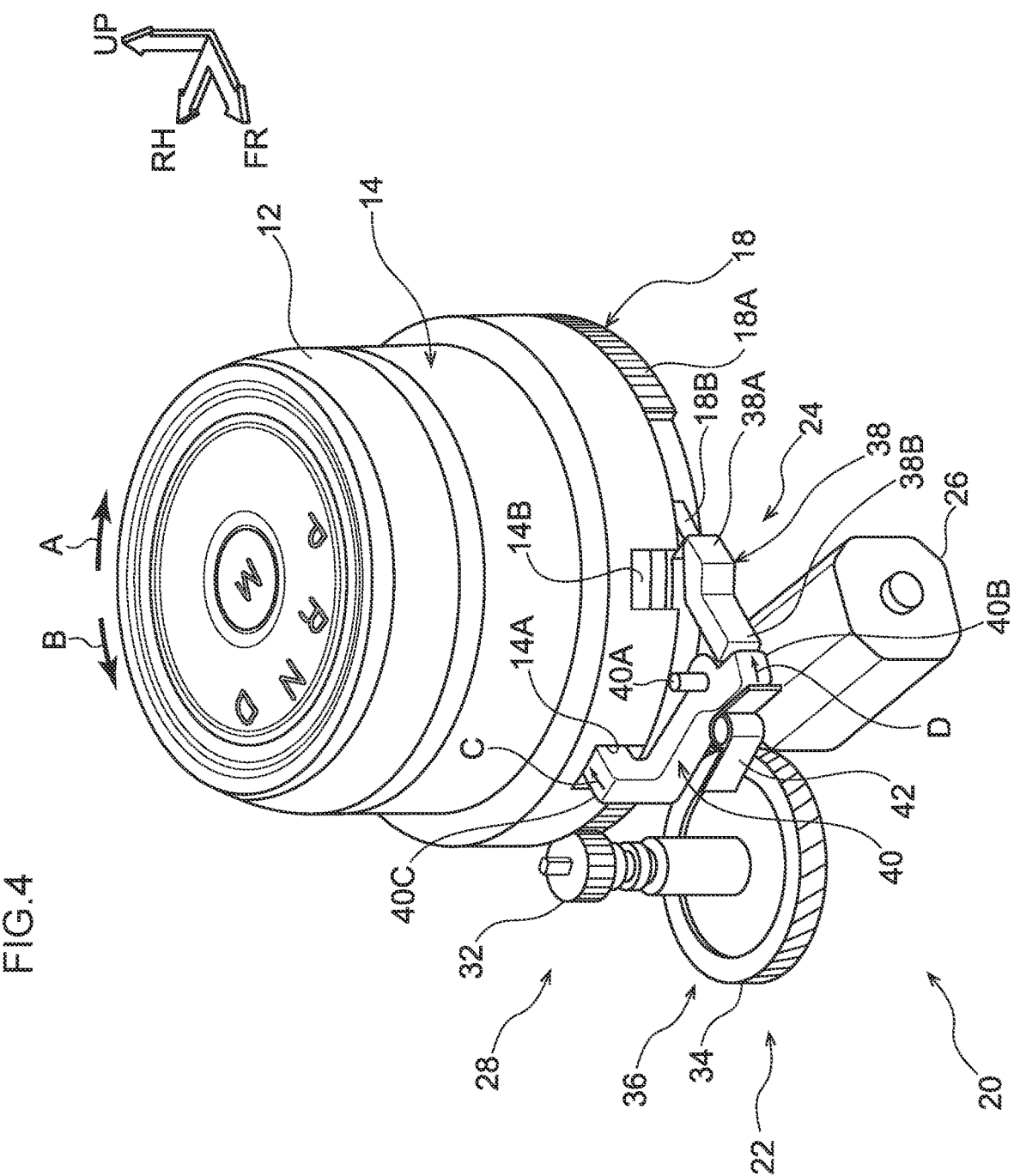
FIG. 4 is a perspective view of the knob and the operation mechanism as viewed from a different direction to that in FIG. 3.

As illustrated in FIG. 2 to FIG. 4, the substantially circular tube shaped knob 12 serving as a shift body is supported by the knob base 16 via the knob body 14 so as to be capable of rotating. The knob 12 is capable of being rotation-operated by an occupant (particularly the driver seated in the driving seat) of the vehicle. The knob 12 is capable of rotating in a specific range (a specific rotation angle) in one direction (the arrow A direction) and another direction (the arrow B direction). The knob 12 is rotated in the one direction or the another direction to change a shift position of the vehicle. In the present exemplary embodiment, the knob 12 is capable of being arranged in a P position (parking position), an R position (reverse position), an N position (neutral position), or a D position (drive position), serving as specific positions on progression from the another direction side toward the one direction side.

As illustrated in FIG. 3 and FIG. 4, the knob 12 is capable of rotating integrally with the knob body 14 due to being attached to an upper end portion of the knob body 14 formed in a substantially circular tube shape. A lever engaging recessed portion 14A, which is open toward outside in a rotation radial direction (in a radial direction of rotation) of the knob 12, is formed in part of a lower end portion of the knob body 14. Note that an indentation (a concave) formed on the another direction side (arrow B direction side) of the portion where the lever engaging recessed portion 14A is formed in the lower end portion of the knob body 14 configures an N lock bar engaging recessed portion 14B which is used to fix the shift position of the knob 12 in the neutral position.

A knob drive gear 18, serving as a shift body-side gear formed in a ring shape, is provided at a lower end of the knob body 14. Teeth 18A that mesh with an intermediate gear 36, described later, are formed about an outer circumferential portion of the knob drive gear 18. In the present exemplary embodiment, the teeth 18A are formed in a specific range about a rotation circumferential direction (about a circumferential direction of rotation) of the knob drive gear 18. An engaging protrusion 18B, serving as engaging portion that projects out toward outside in the rotation radial direction of the knob drive gear 18, is formed at a location of the outer circumferential portion of the knob drive gear 18, where the teeth 18A are not formed. An anchor portion, not illustrated in the drawings, which is anchored at the knob body 14 when the knob drive gear 18 is rotated in the arrow B direction, is also provided at the knob drive gear 18.

The present exemplary embodiment is provided with a non-illustrated shift sensor, serving as a shift detector. The shift sensor detects the rotation position of the knob 12 to detect the shift position of the knob 12. The shift sensor is electrically connected to a controller (not illustrated in the drawings) of the vehicle, and an automatic transmission (not illustrated in the drawings) of the vehicle is electrically connected to the controller. The shift position of the knob 12 is changed to change shift ranges of the automatic transmission (a P range (parking range), an R range (reverse range), an N range (neutral range), or a D range (drive range)), which correspond to the shift positions of the knob 12, under the control of the controller.

An engine start-stop switch, not illustrated in the drawings, is electrically connected to the controller. The engine is started when the engine start-stop switch is operated by the occupant in a state in which the engine has stopped. The engine is stopped when the engine start-stop switch is operated by the occupant in a state in which the engine is running.

A detector for detecting whether or not a brake serving as a braking device of the vehicle is being operated by the occupant is also electrically connected to the controller. The vehicle is made to brake when the brake has been operated by the occupant. A lock switch (not illustrated in the drawings) serving as an operation restricting section is also electrically connected to the controller. The lock switch is capable of being operated by the occupant.

Explanation follows regarding an operation mechanism 20, which restricts, and releases the restriction of, rotation of the knob 12, as well as which is for changing the shift position of the knob 12 to a specific shift position.

The operation mechanism 20 is configured including an autocorrect mechanism 22 serving as a rotary unit which rotates the shift position of the knob 12 to the specific shift position, and a shift lock mechanism 24 serving as a restricting mechanism and a restriction releasing mechanism for restricting, and releasing the restriction of, rotation of the knob 12.

The autocorrect mechanism 22 is configured including a motor 26 serving as a driver, and a transmission mechanism 28 that transmits drive force of the motor 26 to the knob 12. The motor 26 is a direct current motor including a rotation shaft 26A that is rotated by energizing (passing current through). The motor 26 (preferably, as shown in FIG. 3, the entire motor 28) is disposed at the lower side (at the side opposite to a vehicle cabin interior side) with respect to the knob body 14 and the knob drive gear 18 (is disposed at one side in the rotation axis direction of the knob 12 with respect to the knob 12), in a state in which an axial direction of the rotation shaft 26A is oriented in a direction orthogonal to the rotation axis direction of the knob 12.

Further, preferably, as shown in FIG. 3, part of the motor 26 and part of the knob body 14 and the knob drive gear 18 overlap each other in the rotation axis direction of the knob 12. (The entire body of the motor 26 or the entire motor 26 may completely overlap with respect to the knob body 14 and the knob drive gear 18 in the rotation axis direction of the knob 12.)

The transmission mechanism 28 is configured including the knob drive gear 18 provided at the lower side of the knob body 14, a worm gear 30 provided at the rotation shaft 26A of the motor 26, and the intermediate gear 36 serving as a shift body drive gear. The intermediate gear 36 includes a first intermediate gear 32 that meshes with the teeth 18A of the knob drive gear 18, and a second intermediate gear 34 that meshes with the worm gear 30 and rotates integrally with the first intermediate gear 32. Rotation of the rotation shaft 26A of the motor 26 is transmitted to the knob body 14 through the worm gear 30, the intermediate gear 36, and the knob drive gear 18, such that the knob body 14 rotates together with the knob 12. In the present exemplary embodiment, part of the second intermediate gear 34 of the intermediate gear 36 is disposed at the lower side of the knob drive gear 18, such that part of the second intermediate gear 34 of the intermediate gear 36 and part of the knob drive gear 18 overlap each other in the rotation axis direction of the knob 12.

The shift lock mechanism 24 is configured including the motor 26, the knob drive gear 18, a first lever 38 and a second lever 40 each serving as a restricting body that are displaced by rotation of the motor 26 being transmitted through the knob drive gear 18, and a return spring 42 that urges the second lever 40.

The first lever 38 is formed in a block shape, and an end portion on one side in a length direction of the first lever 38 configures an engaged portion 38A that is configured to be engaged by the engaging protrusion 18B provided at the knob drive gear 18. An end portion on another side in the length direction of the first lever 38 configures a pressing (pushing) portion 38B that presses (pushes) a pressed (pushed) portion 40B of the second lever 40, described below. As illustrated in FIG. 2, the first lever 38 is supported by the knob base 16 so as to be capable of sliding (capable of being displaced).

The second lever 40 is formed in a substantially L shape as viewed from the upper side. A swing (tilting) shaft portion 40A formed in a circular column shape with its axial direction along the up-down direction is provided on an intermediate portion of the second lever 40 in a length direction of the second lever 40, which is at the first lever 38 side. The swing shaft portion 40A is supported by the knob base 16, such that the second lever 40 is capable of swinging (tilting) (is capable of rotational displacement) about the swing shaft portion 40A as the axial center. An end portion, which is on the first lever 38 side, of the second lever 40 configures the pressed portion 40B that is configured to be pressed by the first lever 38. An end portion on the opposite side to the pressed portion 40B of the second lever 40 configures a restricting portion 40C that projects out toward the knob body 14 side.

The return spring 42 is formed by bending a plate shaped steel sheet member or the like. Part of the return spring 42 abuts the knob base 16. Another part of the return spring 42 abuts a face of the pressed portion 40B of the second lever 40, whose face is on the opposite side to the side pressed by the pressing portion 38B of the first lever 38. The second lever 40 is urged in a direction so as to swing (tilting) in the arrow D direction by the urging force of the return spring 42.

Operation and Advantageous Effects of Present Exemplary Embodiment

Explanation follows regarding operation and advantageous effects of the present exemplary embodiment.

Figure 5:
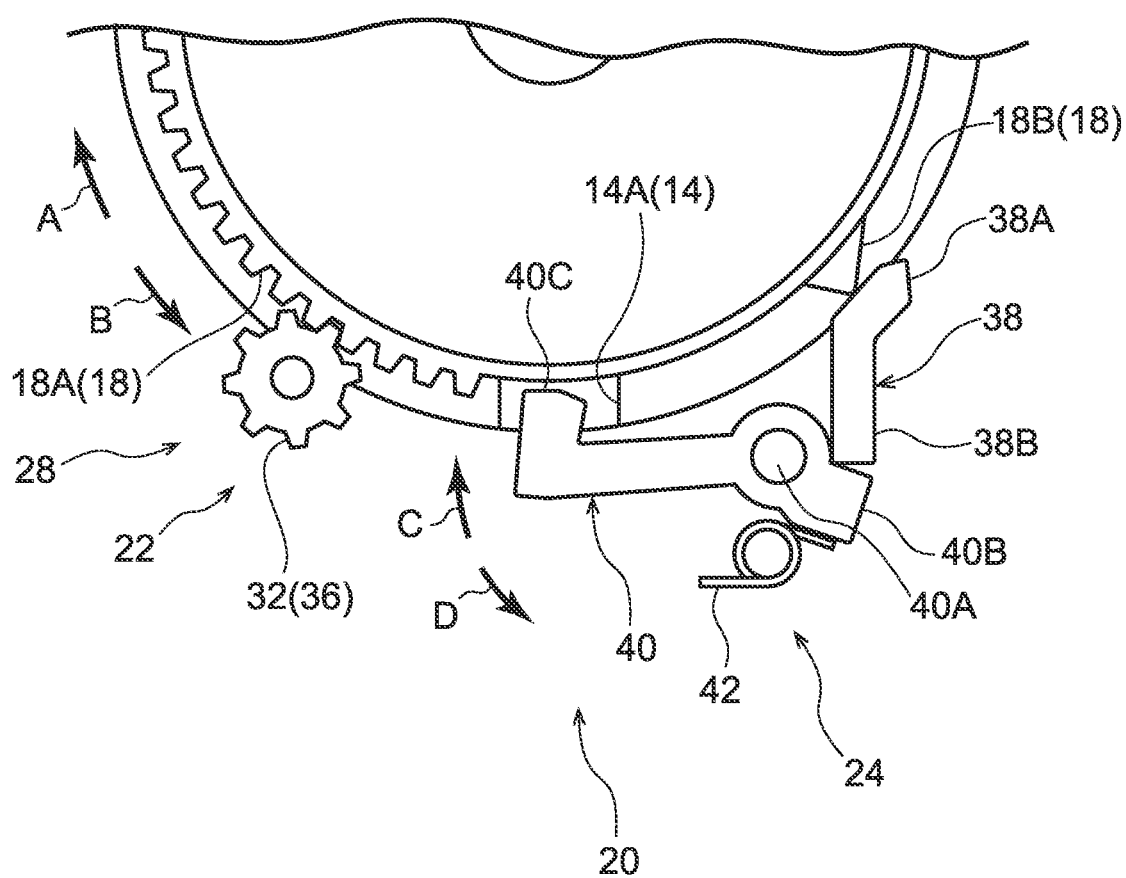
FIG. 5 is a plan view schematically illustrating a shift lock mechanism and so on in a state in which rotation of a knob is restricted.

As illustrated in FIG. 2 to FIG. 4, in the shift device 10 explained above, when the knob 12 has been disposed in the P position (when the shift sensor has detected that the shift position of the knob 12 is in the P position) and the brake is not being operated, the motor 26 is reverse driven to rotate the knob drive gear 18 in the arrow A direction through the worm gear 30 and the intermediate gear 36 in the shift lock mechanism 24 of the operation mechanism 20 under the control of the controller. Note that the anchor (stop) portion of the knob drive gear 18 is not anchored to (stopped at) the knob body 14 when the knob drive gear 18 is rotated in the arrow A direction, and so the rotation of the knob drive gear 18 is not transmitted to the knob body 14. As illustrated in FIG. 5, when the knob drive gear 18 is rotated in the arrow A direction, the engaging protrusion 18B of the knob drive gear 18 engages with the engaged portion 38A of the first lever 38, and moves the first lever 38 toward the second lever 40 side. When the first lever 38 is moved toward the second lever 40 side, the pressing portion 38B of the first lever 38 presses the pressed portion 40B of the second lever 40. Thus, the second lever 40 is swung (tilted) toward the arrow C direction side against the urging force of the return spring 42, and the restricting portion 40C of the second lever 40 is inserted into the lever engaging recessed portion 14A of the knob body 14. Rotation of the knob 12 (knob body 14) is thereby locked (restricted), and rotation of the knob 12 from the P position toward the R position, the N position, and the D position is locked (restricted). Note that, when a non-illustrated lock sensor has detected that the knob drive gear 18 has been rotated to a position where the restricting portion 40C of the second lever 40 is inserted into the lever engaging recessed portion 14A of the knob body 14, the reverse driving of the motor 26 is stopped under the control of the controller.

When the knob 12 has been disposed in the P position and the brake is operated, the motor 26 is forward driven to rotate the knob drive gear 18 in the arrow B direction through the worm gear 30 and the intermediate gear 36 in the shift lock mechanism 24 of the operation mechanism 20 under the control of the controller. Thus, the engaging protrusion 18B of the knob drive gear 18 separates from the engaged portion 38A of the first lever 38, and the second lever 40 is swung (tilted) toward the arrow D direction side by the urging force of the return spring 42. The restricting portion 40C of the second lever 40 thereby comes out from the inside of the lever engaging recessed portion 14A of the knob body 14. The lock on rotation of the knob 12 (knob body 14) is thereby released, and the knob 12 becomes capable of rotating from the P position to the R position, the N position, and the D position. Note that, when the non-illustrated lock sensor has detected that the knob drive gear 18 has been rotated to a position where the restricting portion 40C of the second lever 40 has come out from the inside of the lever engaging recessed portion 14A of the knob body 14, the forward driving of the motor 26 is stopped under the control of the controller.

Note that configuration may be made such that, when the knob 12 has been disposed in the N position (when the shift sensor has detected that the shift position of the knob 12 is in the N position), the restricting portion 40C of the second lever 40 is inserted into the N lock bar engaging recessed portion 14B (see FIG. 4), such that rotation of the knob 12 (knob body 14) is locked, and rotation of the knob 12 from the N position toward the P position, the R position, and the D position is locked. In this case, configuration may be made such that the motor 26 is rotated to engage the engaging protrusion 18B of the knob drive gear 18 with the engaged portion 38A of the first lever 38, when the non-illustrated lock switch has been operated.

When the knob 12 has been disposed in a shift position other than the P position (the R position, the N position, or the D position) (when the shift sensor has detected that the shift position of the knob 12 is in a position other than the P position), and the engine start-stop switch is operated and the engine stopped, the shift range of the automatic transmission is changed to the P range under the control of the controller. This state in which the shift range of the automatic transmission has been changed to the P range is maintained until the engine start-stop switch is next operated to start the engine and thereafter the knob 12 is rotated to a shift position other than the P position (and thereafter the shift sensor detects that the shift position of the knob 12 has been changed to a position other than the P position). Thus, the shift range of the automatic transmission is always in the P range when the engine start-stop switch is operated.

When the knob 12 has been disposed in a shift position other than the P position and the engine start-stop switch is operated (at a specific occasion, this being when at least one out of stopping or starting of the engine has been performed), the motor 26 is forward driven to rotate the knob drive gear 18 in the arrow B direction through the worm gear 30 and the intermediate gear 36 in the autocorrect mechanism 22 of the operation mechanism 20 under the control of the controller. Note that the anchor (stop) portion of the knob drive gear 18 is anchored to (stopped at) the knob body 14 when the knob drive gear 18 is rotated in the arrow B direction, and so the rotation of the knob drive gear 18 is transmitted to the knob body 14. Thus, the knob body 14 is rotated in the another direction (arrow B direction) together with the knob 12, enabling the knob 12 to be disposed in (returned to) the P position and enabling the shift position of the knob 12 and the shift range of the automatic transmission to be made to match (coincide) each other, when the engine start-stop switch is operated.

As explained above, in the present exemplary embodiment, driving a common motor 26 enables rotation of the knob 12 to be locked and locking to be released, enables the shift position of the knob 12 to be changed to the P position, enables the number of components to be reduced, enables the configuration of the shift device 10 to be simplified, and enables an increase in the size of the shift device 10 to be suppressed.

The present exemplary embodiment is configured such that the motor 26 is disposed at the lower side of the knob body 14 and the knob drive gear 18, thereby enabling an increase in the size of the shift device 10 in the rotation radial direction of the knob 12 to be suppressed.

In the present exemplary embodiment, a part of the second intermediate gear 34 of the intermediate gear 36 and a part of the knob drive gear 18 are overlapped with each other in the rotation axis direction of the knob 12, thereby enabling an increase in the size of the shift device 10 in the radial direction (the rotation radial direction of the knob 12) to be suppressed. In the present exemplary embodiment, the first lever 38 and the second lever 40 can be displaced at a desired timing by adjusting the position of the engaging protrusion 18B provided at the knob drive gear 18. Note that in the present exemplary embodiment, the entire motor 26 (which may exclude a portion of the rotation shaft 26A extending out from a housing) may be disposed at the lower side of the knob body 14.

Shift Device According to Second Exemplary Embodiment

Explanation follows regarding a shift device according to a second exemplary embodiment, with reference to FIG. 6 to FIG. 9. Note that members, portions, and so on corresponding to those in the first exemplary embodiment are appended with the same reference numerals as those in the first exemplary embodiment, and explanation thereof is sometimes omitted.

Figure 6:
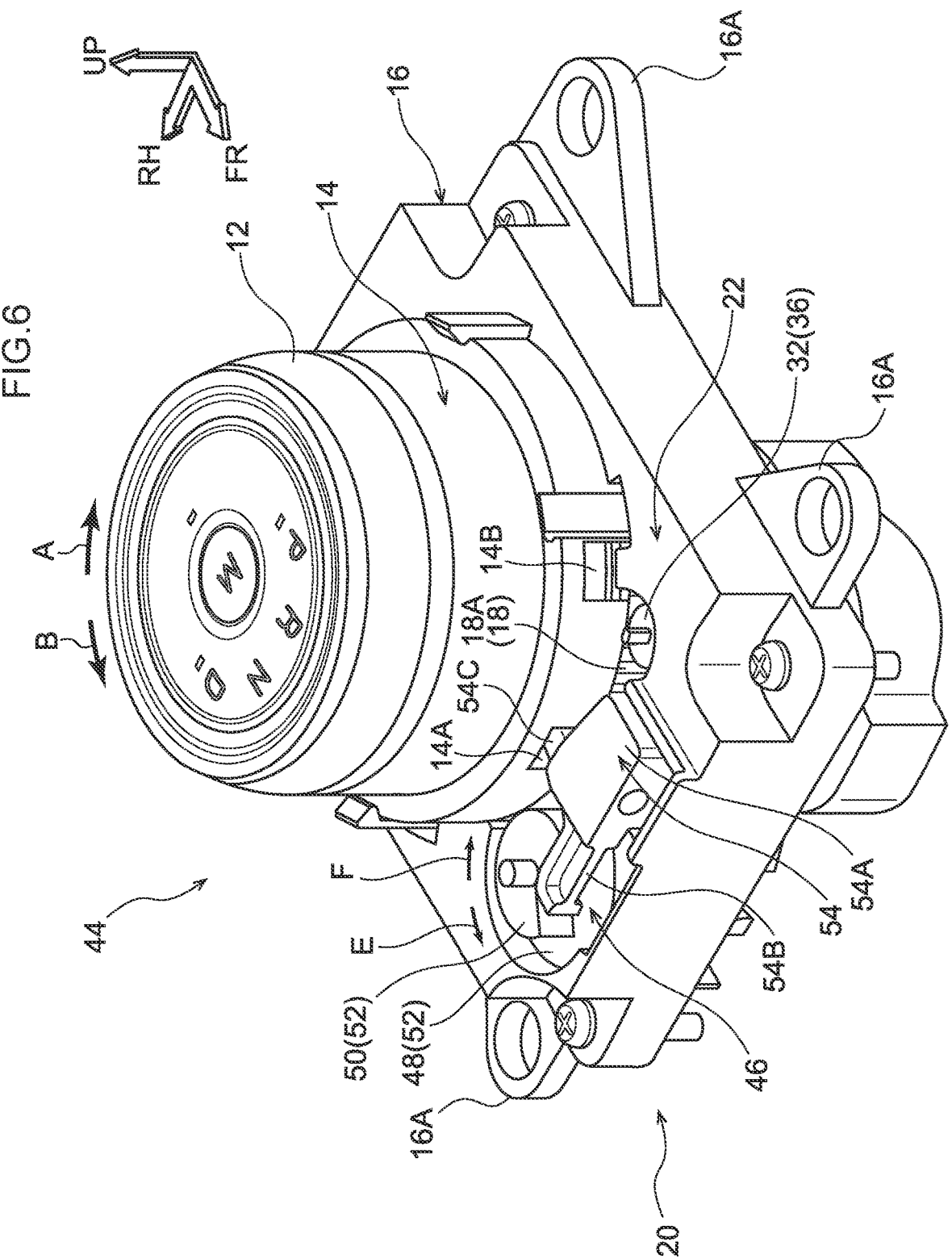
FIG. 6 is a plan view illustrating a shift device of a second exemplary embodiment in a state in which a cover has been removed.
Figure 7:
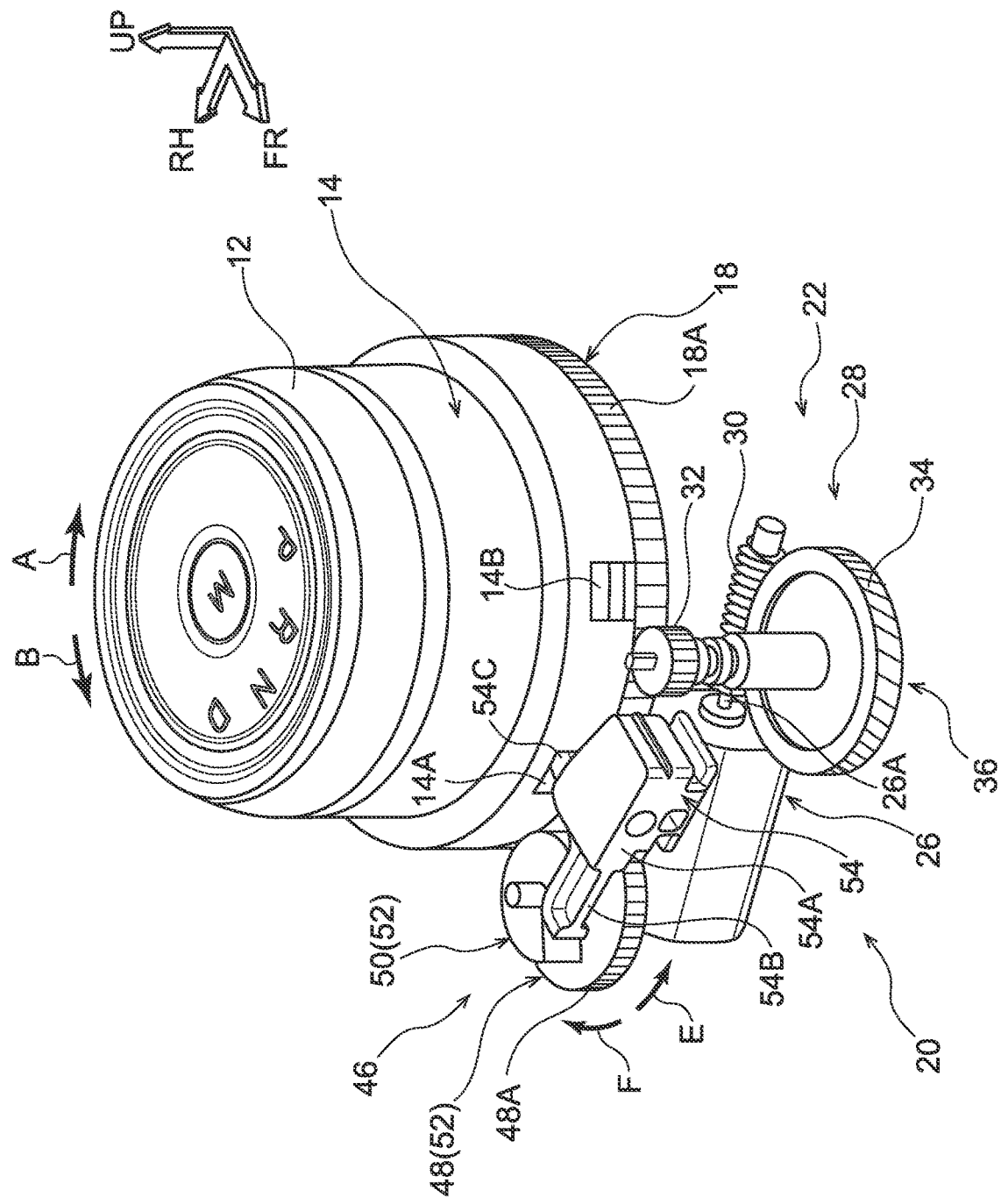
FIG. 7 is a perspective view illustrating a knob and an operation mechanism.

As illustrated in FIG. 6 and FIG. 7, a shift device 44 of the present exemplary embodiment has a feature of including a shift lock mechanism 46 that is a different type to the shift lock mechanism 24 of the shift device 10 of the first exemplary embodiment.

The shift lock mechanism 46 serves as a restricting section and a restriction releasing section, and is configured including a cam configuration section 52 including a cam gear 48 that meshes with the knob drive gear 18 and a cam section 50 that is capable of rotating integrally with the cam gear 48, a lock bar 54 serving as a restricting body that is engaged (abutted) with the cam section 50 of the cam configuration section 52, and a spring 56 (see FIG. 8) that urges the lock bar 54 toward the knob drive gear 18 side.

The cam gear 48 is formed in a circular plate shape. Teeth 48A that mesh with the teeth 18A of the knob drive gear 18 are formed around the entire circumference of an outer circumferential face of the cam gear 48. The cam section 50 is disposed on one side in a rotation axis direction (the upper side) of the cam gear 48 with respect to the cam gear 48. The cam section 50 is formed in a substantially fan shape as viewed from a rotation axis direction of the cam configuration section 52, by cutting out a portion of circular plate. Note that the cutout portion of the cam section 50 is referred to as a cutout portion 50A, and an outer circumferential face of the portion where the cutout portion 50A is not formed is referred to as a release face 50B.

Figure 8:
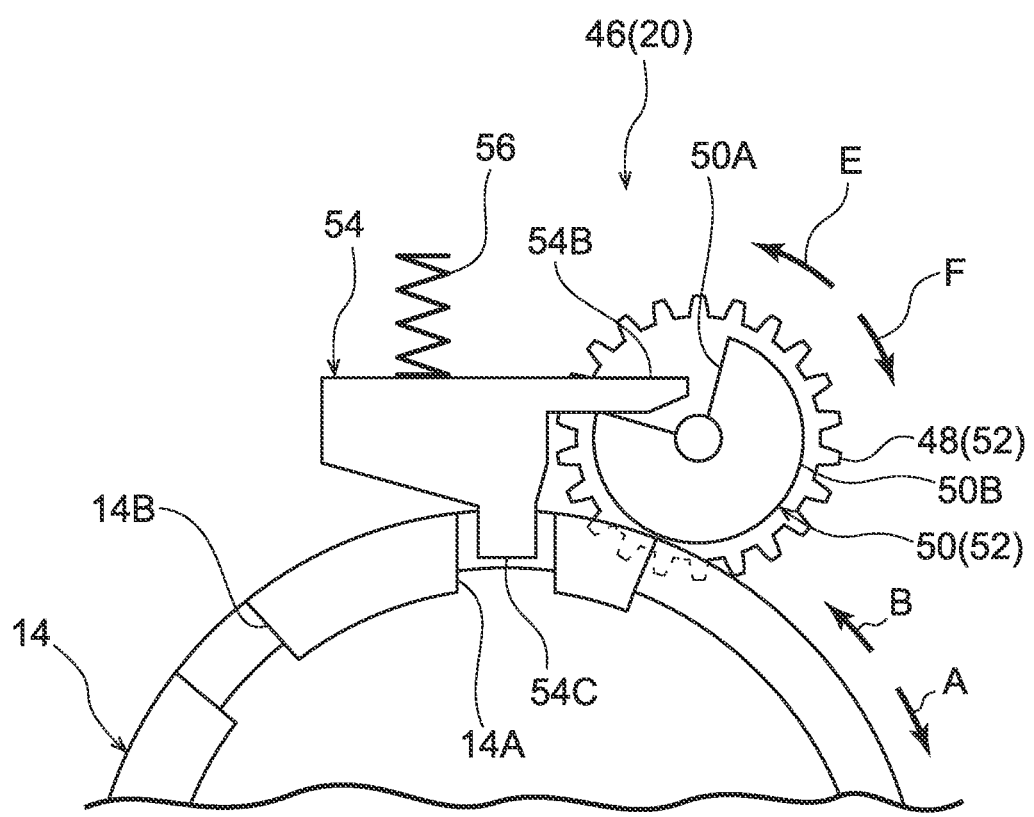
FIG. 8 is a plan view schematically illustrating a shift lock mechanism and so on in a state in which rotation of a knob is restricted.

The lock bar 54 includes a lock bar body 54A formed in a rectangular block shape, a cam section engaging portion 54B that projects out from the lock bar body 54A toward a side of the cam section 50 of the cam configuration section 52 and abuts the cam section 50, and a restricting portion 54C that projects out from the lock bar body 54A toward a side of the knob body 14. As illustrated in FIG. 8, the lock bar 54 is urged toward the knob body 14 side by the spring 56, this being a compression coil spring.

In the shift device 44 of the present exemplary embodiment as explained above, when the knob 12 has been disposed in the P position (when the shift sensor has detected that the shift position of the knob 12 is in the P position) and the brake is not being operated, as illustrated in FIG. 8, the motor 26 is forward driven to rotate the cam configuration section 52 toward the arrow E side through the transmission mechanism 28 (the worm gear 30, the intermediate gear 36, and the knob drive gear 18) in the shift lock mechanism 46 of the operation mechanism 20 under the control of the controller. When the cam configuration section 52 is thus rotated toward the arrow E side, the cam section engagement portion 54B of the lock bar 54 shifts (is changed) from a state abutting the release face 50B of the cam section 50 to a state disposed inside the cutout portion 50A of the cam section 50. In this state in which the cam section engagement portion 54B of the lock bar 54 is disposed inside the cutout portion 50A of the cam section 50, the lock bar 54 is moved toward the knob body 14 side by the urging force of the spring 56, so the restricting portion 54C of the lock bar 54 is inserted into the lever engaging recessed portion 14A of the knob body 14. Rotation of the knob 12 (knob body 14) is thereby locked (restricted), and rotation of the knob 12 from the P position to the R position, the N position, and the D position is locked (restricted).

When the knob 12 has been disposed in the P position and the brake is operated, the motor 26 is reverse driven to rotate the cam configuration section 52 toward the arrow F side through the transmission mechanism 28 in the shift lock mechanism 46 of the operation mechanism 20 under the control of the controller. As illustrated in FIG. 9, when the cam configuration section 52 is thus rotated toward the arrow F side, the cam section engagement portion 54B of the lock bar 54 shifts (is changed) from the state disposed inside the cutout portion 50A of the cam section 50 to a state abutting the release face 50B of the cam section 50. Due to the cam section engagement portion 54B of the lock bar 54 thus shifting from the state disposed inside the cutout portion 50A of the cam section 50 to the state abutting the release face 50B of the cam section 50, the lock bar 54 is moved in a direction away from the knob body 14. The restricting portion 54C of the lock bar 54 thereby comes out from inside the lever engaging recessed portion 14A of the knob body 14. The lock on rotation of the knob 12 (knob body 14) is thereby released, and the knob 12 is capable of rotating from the P position to the R position, the N position, and the D position.

As explained above, in the present exemplary embodiment, driving a common (the same) motor 26 enables rotation of the knob 12 to be locked and locking to be released, enables the shift position of the knob 12 to be changed to the P position, enables the number of components to be reduced, enables the configuration of the shift device 44 to be simplified, and enables an increase in the size of the shift device 44 to be suppressed.

The present exemplary embodiment is configured such that the intermediate gear 36 and the cam configuration section 52 mesh with the same gear, namely, such that the first intermediate gear 32 of the intermediate gear 36 and the cam gear 48 of the cam configuration section 52 mesh with the knob drive gear 18. This configuration enables an increase in the number of components configuring the transmission mechanism 28 and the shift lock mechanism 46 to be suppressed. In the present exemplary embodiment, the lock bar 54 can be displaced at the desired timing by adjusting the shape of the cam section 50. In the present exemplary embodiment, the restricting portion 54C of the lock bar 54 is slid and is inserted into the lever engaging recessed portion 14A of the knob body 14 to lock rotation of the knob 12. This enables the size of the lever engaging recessed portion 14A with respect to the restricting portion 54C to be reduced, enabling rotation locking performance of the knob 12 by the restricting portion 54C to be improved.

Note that in the first exemplary embodiment and second exemplary embodiment, when the engine start-stop switch has been operated and the engine is stopped in a state in which the knob 12 is disposed in a shift position other than the P position, configuration may be such that the shift position of the knob 12 is changed to the P position after the shift range of the automatic transmission has been changed to the P range, or such that the shift range of the automatic transmission is changed to the P range after the shift position of the knob 12 has been changed to the P position.

In the first exemplary embodiment and the second exemplary embodiment, the shift lock mechanism 24 and 46 locks and releases locking of rotation of the knob 12 from the P position and the N position. However, the shift lock mechanism 24 and 46 may lock and release locking of rotation of the knob 12 from a shift position other than the P position (such as the R position or the D position).

In the first exemplary embodiment and the second exemplary embodiment, the shift lock mechanism 24 and 46 locks and releases locking of rotation of the knob 12. However, it is sufficient that the shift lock mechanism 24 and 46 performs at least one out of locking or releasing locking of rotation of the knob 12.

In the first exemplary embodiment and the second exemplary embodiment, the autocorrect mechanism 22 changes the shift position of the knob 12 to the P position. However, the autocorrect mechanism 22 may change the shift position of the knob 12 to a shift position other than the P position (such as the R position, the N position, or the D position).

In the first exemplary embodiment and the second exemplary embodiment, an example has been given in which the present disclosure is applied to the shift device 10 and 44 employed in a shift-by-wire device; however, the present disclosure is not limited thereto. The present disclosure may be applied to a shift device employed in a device other than a shift-by-wire type (such as a mechanical cable type).

In the first exemplary embodiment and the second exemplary embodiment, the shift device 10 and 44 is installed to an instrument panel. However, the shift device 10 and 44 may be installed to a center console, a steering column cover, or the like.

Exemplary embodiments have been explained above; however, the present disclosure is not limited to the above description, and obviously various other modifications may be implemented within a range not departing from the spirit of the present invention.

What is claimed is:

1. A shift device comprising:
a shift body that is rotated to change a shift position; and
an operation mechanism that is provided with a driver, the driver being driven to perform at least one of restricting or releasing restriction of rotation of the shift body, and the driver being driven to change a shift position of the shift body to a specific shift position, wherein the operation mechanism includes:
   a rotary unit that includes: the driver, which is disposed at one side in a rotation axis direction of the shift body with respect to the shift body;
   a transmission mechanism that transmits drive force of the driver to the shift body, and
   a restricting mechanism that is displaced by drive force of the driver being transmitted so as to perform at least one of restricting or releasing restriction of rotation of the shift body, the restricting mechanism including
      a cam gear that is configured to rotate about a rotation axis which is different from the rotation axis of the shift body;
      a cam element that is configured to rotate integrally with the cam gear, and
      a restricting body that is engaged with the cam element, and that is displaced by the cam element being rotated so as to perform at least one of restricting or releasing restriction of rotation of the shift body.

2. The shift device of claim 1, wherein the transmission mechanism includes:
   a shift body gear that is configured to rotate integrally with the shift body;
   an intermediate gear that meshes with the shift body gear and that is rotated by drive force of the driver being transmitted thereto, and wherein the restricting mechanism includes
   a cam gear that meshes with the shift body gear.

3. The shift device of claim 1, wherein the cam element has a cam face with which the restricting body is engaged.

4. A shift device comprising:
a shift body that is rotated to change a shift position; and
an operation mechanism that is provided with a driver, the driver being driven to perform at least one of restricting or releasing restriction of rotation of the shift body, and the driver being driven to change a shift position of the shift body to a specific shift position, wherein the operation mechanism includes:
   a rotary unit that includes:
   the driver, which is disposed at one side in a rotation axis direction of the shift body with respect to the shift body; and
   a transmission mechanism that transmits drive force of the driver to the shift body; and
   a restricting mechanism that is displaced by drive force of the driver being transmitted so as to perform at least one of restricting or releasing restriction rotation of the shift body,
wherein the transmission mechanism includes a shift body gear that is configured to rotate integrally with the shift body and that is formed coaxially with respect to the shift body, and
wherein the drive force of the driver is transmitted to the restricting mechanism via the shift body gear of the transmission mechanism.

* * * * *